United States Patent
Do et al.

(10) Patent No.: US 10,484,618 B1
(45) Date of Patent: Nov. 19, 2019

(54) ULTRA-HIGH DYNAMIC RANGE CMOS SENSOR

(71) Applicant: BAE Systems Imaging Solutions Inc., San Jose, CA (US)

(72) Inventors: Hung T. Do, San Jose, CA (US); Chenguang Gong, San Jose, CA (US); Paul G. Lim, Fremont, CA (US); Alberto M. Magnani, Danville, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 0 days.

(21) Appl. No.: 16/169,895

(22) Filed: Oct. 24, 2018

(51) Int. Cl.
*H04N 5/235* (2006.01)
*H04N 5/378* (2011.01)
*H04N 5/374* (2011.01)
*H04N 5/355* (2011.01)

(52) U.S. Cl.
CPC ....... *H04N 5/2355* (2013.01); *H04N 5/35581* (2013.01); *H04N 5/374* (2013.01); *H04N 5/378* (2013.01)

(58) Field of Classification Search
CPC .. H04N 5/2355; H04N 5/355; H04N 5/35581; H04N 5/3559; H04N 5/374; H04N 5/3741; H04N 5/3745; H04N 5/37452; H04N 5/376; H04N 5/378
See application file for complete search history.

(56) References Cited

U.S. PATENT DOCUMENTS

| | | | | |
|---|---|---|---|---|
| 6,727,946 | B1* | 4/2004 | Zhao | H04N 5/363 250/208.1 |
| 9,819,882 | B2* | 11/2017 | Dierickx | H01L 27/14609 |
| 10,057,530 | B2* | 8/2018 | Mu | H04N 5/35545 |
| 2017/0244921 | A1* | 8/2017 | Velichko | H01L 27/14627 |
| 2019/0166291 | A1* | 5/2019 | Magnani | H04N 5/235 |

FOREIGN PATENT DOCUMENTS

WO    2018/140012 A1    8/2018

OTHER PUBLICATIONS

Wang, A 89dB Dynamic Range CMOS Image Sensor with Dual Transfer Gate Pixel, Paper R36, CMOSIS nv, 2011 International Image Sensor, Antwerpen, Belgium.

* cited by examiner

*Primary Examiner* — Ngoc Yen T Vu
(74) *Attorney, Agent, or Firm* — Calvin B. Ward

(57) ABSTRACT

An imaging array having a plurality of pixel sensors connected to a bit line is disclosed. Each pixel sensor includes a capacitive overflow pixel sensor characterized by an overflow capacitor having a switching terminal, and a floating diffusion node, a buffer amplifier that connects the floating diffusion node to a bit line in response to row select signal, and a switch that connects the switching terminal to either ground or a boost voltage. The imaging array also includes a switch controller that controls the switch and is connected to the bit line, the switch controller determining a voltage on the bit line, the switch controller connecting the switching terminal to the boost voltage during an exposure of the pixel sensor to light and to either ground or the boost voltage during a readout of charge stored on the overflow capacitor depending on the voltage on the bit line.

5 Claims, 5 Drawing Sheets

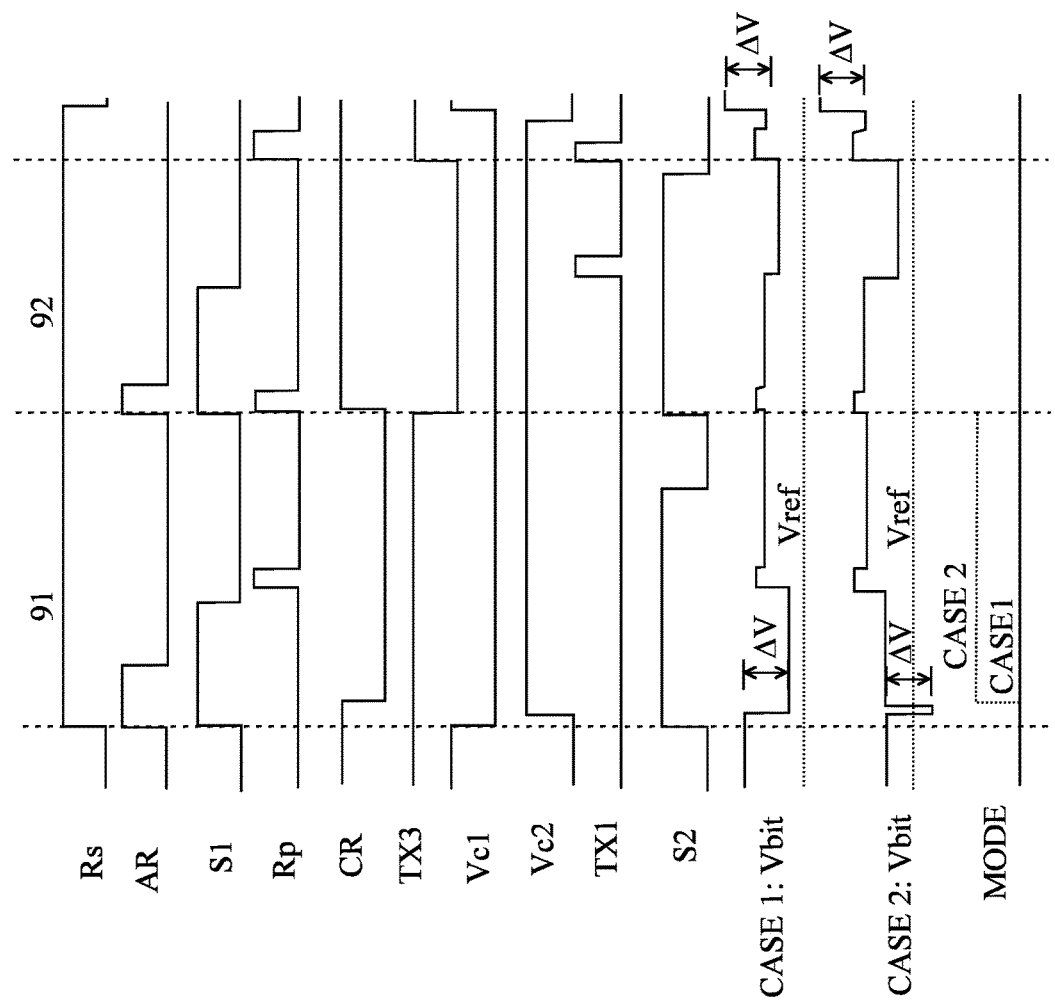

ULTRA-HIGH DYNAMIC RANGE CMOS SENSOR

BACKGROUND

Very high dynamic range image sensors are key to solving many problems in a multitude of areas including automotive sensing, machine vision, professional video, scientific imaging, and others. Automotive imaging applications are particularly demanding. There are often very wide dynamic range scenes which include outdoor sunlit scenes, transitions to dark areas such as tunnels and tree canopy-lined streets, bright LED lights which introduce distracting flickering in scene captures, etc.

One class of solutions utilizes multiple exposures having different exposure times to generate a high dynamic range image. However, the resulting scene can suffer from motion blur.

Another class of solutions relies on multiple photodiodes in each pixel in which the photodiodes have different light conversion efficiencies. Such multiple photodiode systems suffer from different spectral responses between the photodiodes, and hence, providing a high dynamic range output by converting the individual photodiode responses and combining the responses poses significant challenges.

SUMMARY

The system of the present disclosure broadly includes an imaging array having a plurality of pixel sensors connected to a bit line. Each pixel sensor includes a capacitive overflow pixel sensor characterized by an overflow capacitor having a switching terminal, and a floating diffusion node, a buffer amplifier that connects the floating diffusion node to a bit line in response to a row select signal, and a switch that connects the switching terminal to either ground or a boost voltage. The imaging array also includes a switch controller that controls the switch and is connected to the bit line, the switch controller determining a voltage on the bit line, the switch controller connecting the switching terminal to the boost voltage during an exposure of the pixel sensor to light and to either ground or the boost voltage during a readout of charge stored on the overflow capacitor depending on the voltage on the bit line.

In one aspect of the system, the switch controller outputs a signal indicative of whether the switching terminal was connected to ground or the boost voltage during the readout.

In another aspect of the system, the switch controller includes a comparator that compares the voltage on the bit line with a predetermined reference voltage, the comparator having an output of either ground or the boost voltage if the voltage on the bit line is greater than or less than or equal to the predetermined reference voltage, respectively.

In another aspect of the system, the capacitive overflow pixel sensors are constructed in a process that sets a maximum allowed voltage on across a gate in the capacitive overflow pixel sensor and wherein the floating diffusion nodes are reset to a reset voltage prior to exposing the apparatus to light, the boost voltage plus the reset voltage is less than the maximum allowed voltage.

In another aspect of the system, the floating diffusion node is characterized by a voltage swing on the floating diffusion node and wherein the predetermined reference voltage is chosen to maximize the voltage swing.

BRIEF DESCRIPTION OF THE DRAWINGS

FIG. 5 illustrates the timing of the various control signals during the readout of pixel sensor 89.

DETAILED DESCRIPTION

Figure 1:
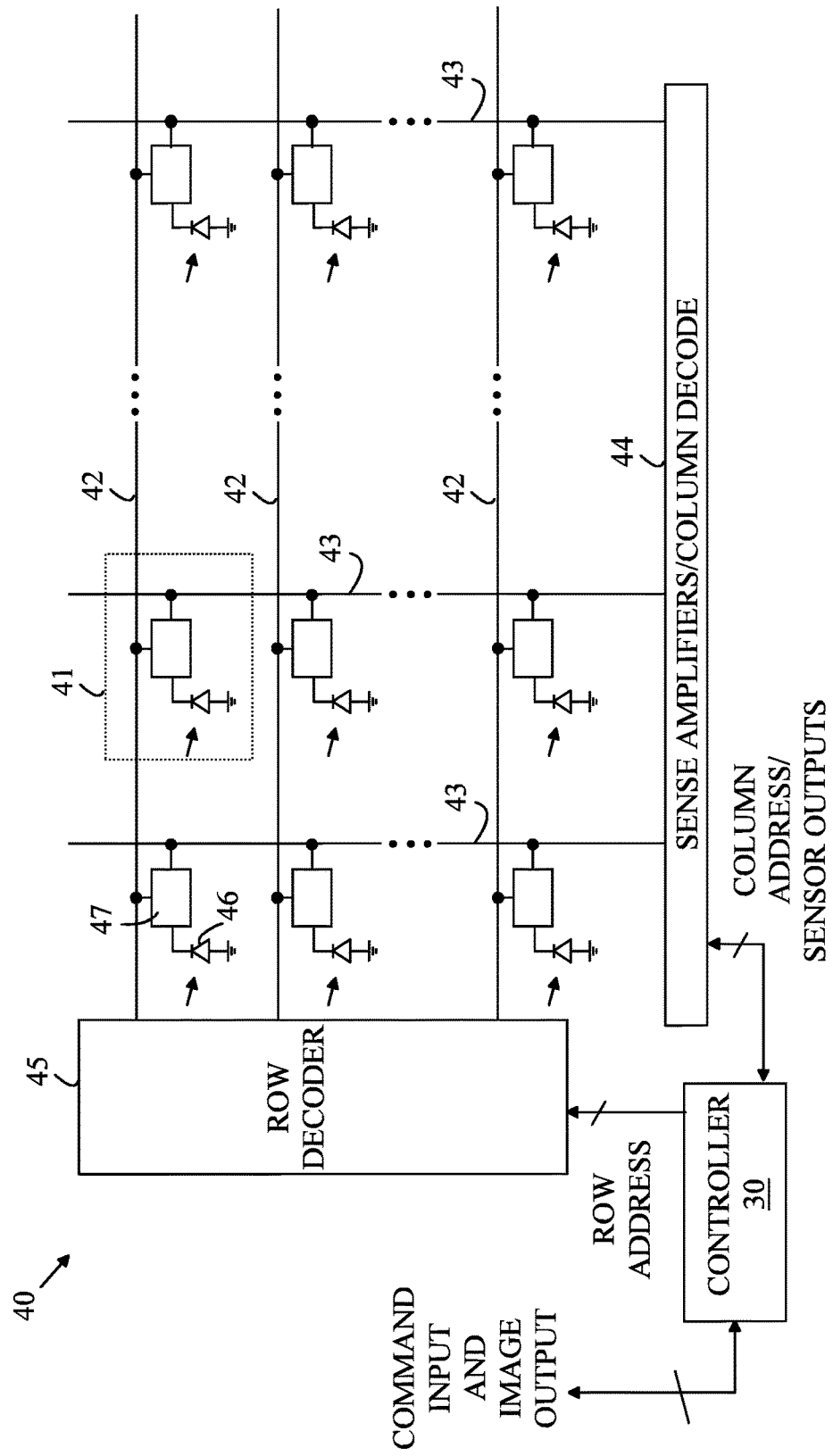
FIG. 1 is a schematic drawing of one embodiment of a CMOS imaging array.

Refer now to FIG. 1, which is a schematic drawing of one embodiment of a CMOS imaging array. Imaging array 40 is constructed from a rectangular array of pixel sensors 41. Each pixel sensor includes a photodiode 46 and an interface circuit 47. The details of the interface circuit depend on the particular pixel design. However, all of the pixel sensors include a gate that is connected to a row line 42 that is used to connect that pixel sensor to a bit line 43. The specific row that is enabled at any time is determined by a row address that is input to a row decoder 45. The row select lines are a parallel array of conductors that run horizontally in the metal layers over the substrate in which the photodiodes and interface circuitry are constructed.

Each of the bit lines terminates in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel sensor is read out from the imaging array. The specific column that is read out is determined by a column address that is utilized by a column decoder to connect the sense amplifier/ADC output from that column to circuitry that is external to the imaging array. The sequencing of the control signals and other functions are performed by a controller 30. To simplify the drawings, the connections between controller 30 and the various control lines have been omitted from the drawing.

Figure 2:
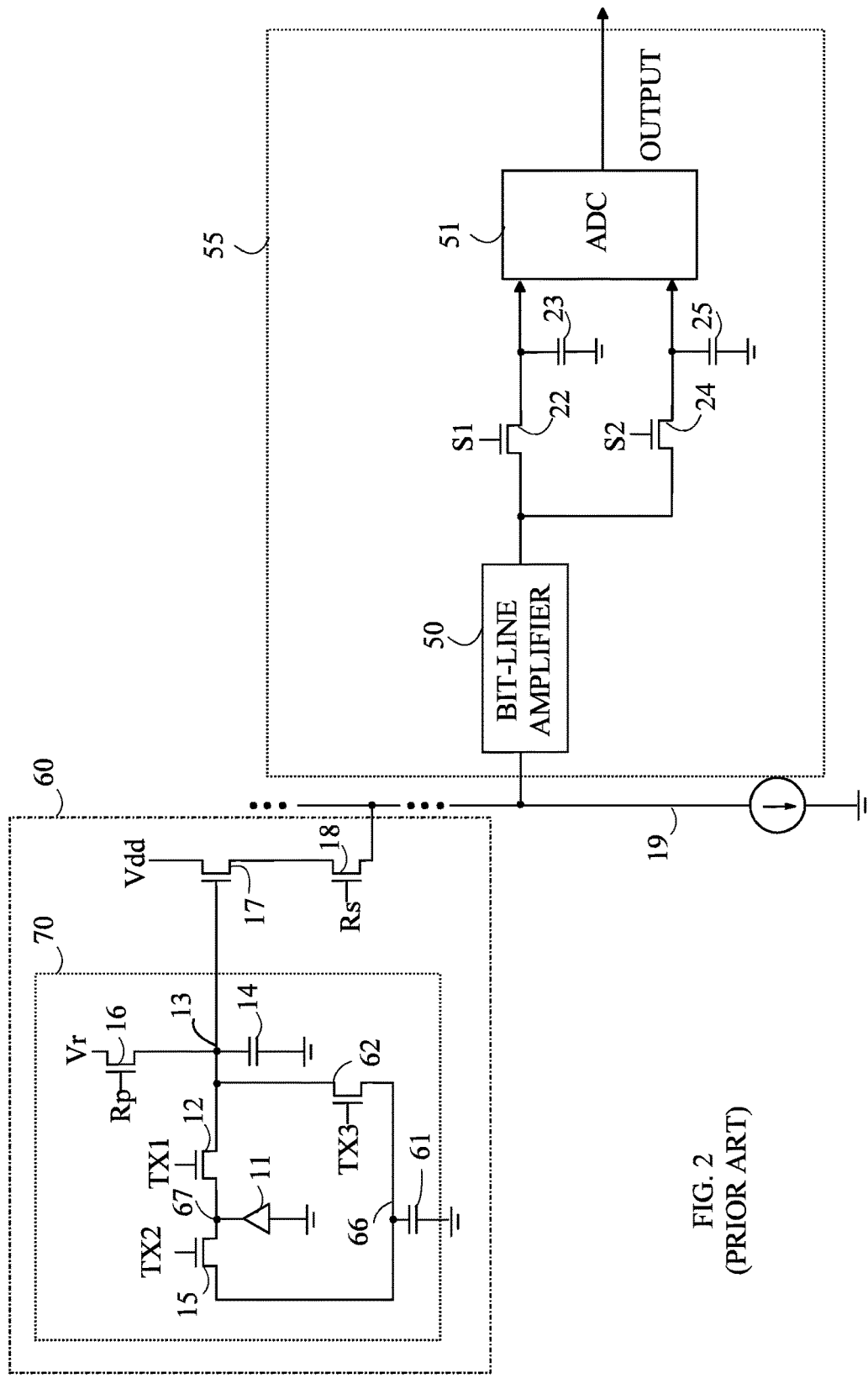
FIG. 2 illustrates a prior art pixel sensor that utilizes a single photodiode in each pixel sensor and an overflow capacitor to extend the range of the dynamic range of the pixel sensor.

The manner in which the imaging array provides its advantages can be more easily understood with reference to an array of prior art extended range pixel sensors that are taught in PCT application PCT/US17/14976, filed on Jan. 25, 2017, which is hereby incorporated in its entirety. Refer now to FIG. 2, which illustrates a prior art pixel sensor that utilizes a single photodiode in each pixel sensor and an overflow capacitor to extend the range of the dynamic range of the pixel sensor.

To simplify the following discussion, the portion of pixel sensors 60 shown at 70 will be referred to as a capacitive overflow pixel sensor. The capacitive overflow pixel sensor includes a photodiode 11 and that overflow capacitor 61 is characterized by first and second capacitor terminals. Photodiode 11 is connected to a floating diffusion node 13 by photodiode transfer gate 12. Photodiode 11 is also connected to the first capacitive terminal of overflow capacitor 61 by overflow gate 15. The first capacitive terminal of overflow capacitor 61 is also connected to floating diffusion node 13 by overflow capacitor gate 62. Floating diffusion node 13 is characterized by a parasitic capacitance shown at 14. The voltage on floating diffusion node 13 can be set to a voltage Vr by placing gate 16 in a conductive state.

Referring again to pixel sensors 60, floating diffusion node 13 is connected to source follower 17 which generates an output voltage indicative of the potential on floating diffusion node 13. The output of source follower 17 can be coupled to a bit line 19 by gate 18. The second capacitive terminal of overflow capacitor 61 is connected to ground in pixel sensors 60.

Bit line 19 terminates in a column processing circuit 55. Column processing circuit 55 includes a bit-line amplifier 50 and two sample and hold circuits whose functions will be described in more detail below. The first sample and hold circuit comprises gate 22 and capacitor 23, and the second sample and hold circuit comprises gate 24 and capacitor 25. The outputs of these sample and hold circuits are processed by ADC 51 to provide the output value for the pixel sensor currently connected to bit line 19. The manner in which the sample and hold circuits are used will be discussed in more detail below.

Overflow capacitor 61 collects the photocharge generated by photodiode 11 after the potential at node 67 reaches a potential during the exposure that is determined by the voltage on node 67 and the voltage of TX2. At the beginning of an exposure, photodiode 11 and overflow capacitor 61 are set to a reset voltage determined by Vr. As photocharge accumulates on photodiode 11, the voltage on photodiode 11 decreases. At a voltage determined by the gate voltage on overflow gate 15, the excess charge flows through overflow gate 15 and onto the combination of overflow capacitor 61, capacitor 14, and the parasitic capacitances of overflow capacitor gate 62, which remains in a conducting state throughout the exposure.

The charge that has accumulated either on node 67 or overflow capacitor 61 can be read as follows: In one embodiment, overflow capacitor 61 is read first. During the exposure, TX3 is high, and hence, overflow capacitor 61 is connected to floating diffusion node 13. The potential on floating diffusion node 13 is the difference between the reset potential that was applied to floating diffusion node 13 and overflow capacitor 61 just prior to the start of the next exposure. The potential on floating diffusion node 13 is stored on capacitor 23. Then, floating diffusion node 13 and node 66 are reset, and the reset potential is stored on capacitor 25. The difference in potentials on capacitors 23 and 25 is then digitized by ADC 51.

The potential on photodiode 11 is then read. First, overflow capacitor 61 is isolated by placing overflow capacitor gate 62 in the non-conducting state, and floating diffusion node 13 is again reset to Vr. The actual potential on floating diffusion node 13 is then stored on capacitor 23. Gate 12 is then placed in the conducting state, which transfers the charge on photodiode 11 to floating diffusion node 13. The potential on floating diffusion node 13 is stored on capacitor 25. The difference in potentials on capacitors 23 and 25 is then digitized by ADC 51.

The maximum photocharge that can be stored in overflow capacitor 61 is determined by the voltage on node 66 after pixel sensor 60 is reset prior to an exposure. Pixel sensor 60 is reset by placing gates 16, 12, and 62 in conducting states and then isolating photodiode 11 and overflow capacitor 61 by placing gates 16 and 12 in a non-conducting state. This leaves nodes 66 and 67 and 13 at a potential of Vr. As the exposure proceeds, electrons generated in photodiode 11 decrease the potential on node 67. When the potential on node 67 drops to a value determined by the voltage on overflow gate 15, the photo-electrons overflow onto overflow capacitor 61. Each photo-electron that is stored on overflow capacitor 61 lowers the potential at node 66. When the potential on node 66 or 13 reaches the potential at which the bit line 19 is saturated during the readout phase, the maximum full-well capacity or maximum photocharge is reached. The bit line is saturated when its voltage doesn't follow the voltage on floating diffusion node 13 linearly.

The dynamic range of pixel sensor 60 is the ratio of the maximum photocharge that can be stored in the pixel sensor to the minimum photocharge that can be detected by the readout circuitry. The maximum photocharge is the sum of the charge stored on overflow capacitor 61 and the charge stored on photodiode 11 at readout. Hence, to increase the dynamic range in the pixel shown in FIG. 2, the capacitance of overflow capacitor 61 would need to be increased. However, there are limits to the size of the overflow capacitor, since there must be one such capacitor per pixel sensor.

Figure 3:
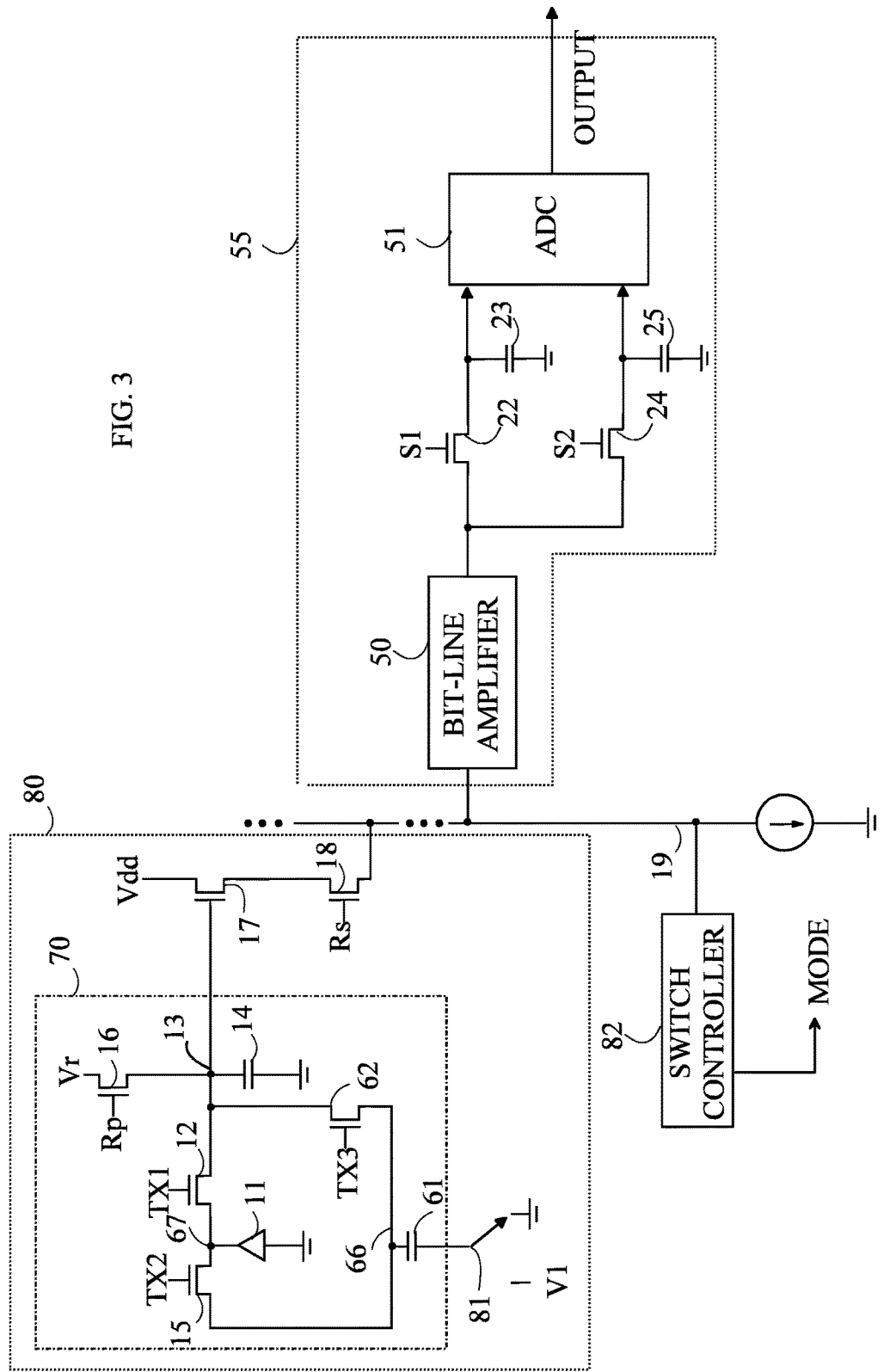
FIG. 3 illustrates one pixel sensor according to one embodiment of the system and the associated column readout circuitry.

The system overcomes this problem by boosting the voltage at node 66 after the node has been reset to Vr and altering the readout circuitry to accommodate the increased voltage. Refer now to FIG. 3, which illustrates one pixel sensor according to one embodiment of the system and the associated column readout circuitry. To simplify the following discussion, those elements of pixel sensor 80 and the corresponding column processing circuitry that perform functions analogous to elements shown in FIG. 2 have been given the same numerical designations.

Pixel sensor 80 differs from pixel sensor 60 in that the second capacitor terminal of overflow capacitor 61 that was connected to ground is now connected to a switch 81 that connects that terminal to either ground or a potential V1. This terminal will be referred to as the switched terminal in the following discussion. There is one such switch in each pixel sensor. Switch 81 is controlled by a switch controller 82 that is part of the readout circuitry and shared by each pixel sensor in a column. The operation of pixel sensor 80 can be viewed as consisting of three phases: reset, charge accumulation, and readout. During reset, switch 81 connects the switching terminal to ground. Gates 16, 12, and 62 are placed in the conducting state, and hence, nodes 13, 67, and 66 are set to Vr. Gates 16 and 12 are then set to the non-conducting state, and the switched terminal is connected to a potential V1. This results in the potential at node 66 increasing from Vr by an amount ΔVFD, and hence, the storage capacity of overflow capacitor 61 for storing the overflow charge from photodiode 11 is increased by V1 times the capacitance of overflow capacitor 61. Equation 1 shows the relation between ΔVFD and V1.

During the charge accumulation phase, pixel sensor 80 is operated in the same manner as pixel sensor 60 discussed above. At the end of the charge accumulation phase, the charges stored on photodiode 11 and overflow capacitor 61 are readout. The readout of the charge stored on node 67 proceeds in a manner analogous to that used for pixel sensor 60 discussed above.

The readout of the charge stored on overflow capacitor 61 depends on the level of charge stored on overflow capacitor 61. Consider the case in which the charge stored on overflow capacitor 61 is small and switch 81 connects the switch terminal to V1. The voltage at node 66 will be high, perhaps even greater than Vr. Hence, the voltage on the bit line will be high, and, in the case where the voltage on node 66 is greater than Vr, cannot be readout. Accordingly, if the voltage at node 66 is too high, the switch terminal must be connected to ground for readout.

Now consider the case in which the overflow charge was large. The voltage at node 66 with the switch terminal connected to V1 will be less than Vr, and hence, can be readout even with the switching terminal connected to V1. It should be noted that if the accumulated charge on overflow capacitor 61 is very large because the starting voltage was increased by ΔVFD, the potential at node 66 could be negative if the switching terminal is connected to ground. Hence, for large overflow charge exposures, the switching terminal is connected to V1 at readout.

The state of switch 81 is set by switch controller 82 that monitors the voltage on bit line 19 when pixel sensor 80 is being readout. At the beginning of the readout for overflow capacitor 61, switch controller 82 sets switch 81 such that the switching terminal is at ground. Overflow capacitor gate 62 remains conducting. If the voltage on the bit line is less than a reference voltage, switch controller 82 switches the switching terminal to V1. Switching controller also outputs a signal indicating whether the switching terminal was at ground or V1.

Figure 4:
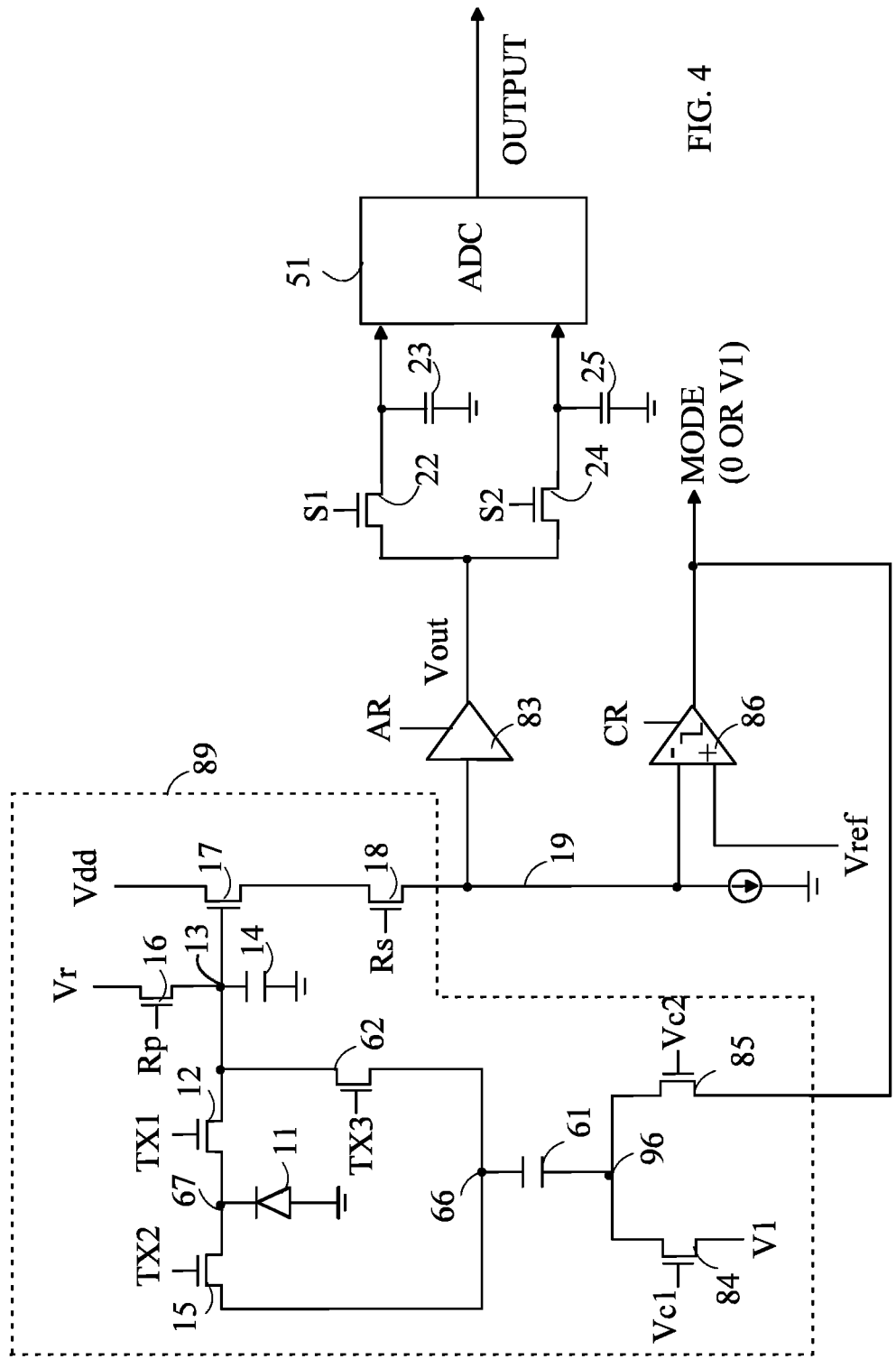
FIG. 4 illustrates one pixel sensor and switch controller according to one embodiment of the system.

Refer now to FIG. 4, which illustrates one pixel sensor and switch controller according to one embodiment of the system. To simplify the following discussion, those elements of pixel sensor 89 and the corresponding column processing circuitry that perform functions analogous to elements shown in FIG. 3 have been given the same numerical designations. Switch 81 shown in FIG. 3 is implemented by gates 84 and 85 in pixel sensor 89. Switch controller 82 comprises a comparator 86 whose output is either ground or V1. The switching level of comparator 86 is set by a reference voltage Vref. Comparator 86 is reset to zero by a signal CR.

Refer now to FIG. 5, which illustrates the timing of the various control signals during the readout of pixel sensor 89. The readout is divided into two phases. In phase 91, the photocharge that overflowed onto overflow capacitor 61 is measured. In phase 92, the charge that was accumulated by photodiode 11 on node 67 is read. At the end of phase 92 of the previous frame, signal Rp, TX3 and TX1 go high to empty the photodiode 11 and set the floating diffusion node 13 and node 66 to voltage Vr. During this time, signals Vc2 and CR are high; therefore, the voltage at the switching terminal is equal to zero, which is the value of the output of comparator 86. Next, signal TX1 goes low to start integrating photocharge onto the photodiode 11.

Next, signal Rp goes low to isolate floating diffusion node 13 from the voltage Vr. Signal Vc2 also goes low to isolate the switching terminal from the output of comparator 86. Then, signal Vc1 goes high to connect the switching terminal to voltage V1. Thus, voltages at nodes 66 and 13 are increased by the amount of $$\Delta VFD = (Cp*V1)/C\text{total} \quad (1)$$

Where Cp is the capacitance of overflow capacitor 61, and Ctotal is the sum of the capacitances of overflow capacitor 61, the parasitic capacitance of overflow capacitor gate 62, the parasitic capacitance at node 66, and the parasitic capacitance of the floating diffusion node 13.

At this time the bit line voltage Vbit is also increased by the amount of $$\Delta V = \Delta VFD * GSF \quad (2)$$

where GSF is the source follower gain and ΔVFD is the increase in voltage on floating diffusion node 13 or node 66.

Next, signal Rs goes low to isolate the selected pixel from the bit line. After one frame of integrating, this pixel will be selected again when signal Rs goes high. The readout process is started with phase 91. At this time, signal AR goes high to reset column bit-line amplifier 83. Signals S1 and S2 also go high to connect the amplifier output Vout to sampling capacitors 23 and 25. Signal Vc1 goes low to isolate node 96 from the voltage V1. Next, signal Vc2 goes high to connect the switching terminal of overflow capacitor 61 to the output of comparator 86. Because signal CR is high at this time, the output of comparator 86 is zero, and hence, the switching terminal is at ground. As a result, voltages at node 66 and floating diffusion node 13 are reduced by the amount of ΔVFD. Bit line voltage, Vbit, is also reduced by the amount of ΔV.

Next, signal CR goes low to enable the comparator 86 to test the signal on the bit line against the reference voltage. At this time, comparator 86 compares the value of bit line voltage Vbit to the reference voltage, Vref. There are two cases of interest. In case 1, the voltage on bit line 19, Vbit, is higher than or equal to the reference voltage Vref, and the comparator output, MODE, is equal to zero. There is no change in voltage at node 66 and floating diffusion node 13.

In case 2, Vbit is lower than the Vref, and the comparator output MODE is equal to voltage V1. In this case, the voltage on the switching terminal returns back to voltage V1. As a result, voltages at node 66 and floating diffusion node 13 are increased by the amount of ΔVFD. Also, Vbit is increased by the amount of ΔV.

Next, signal AR goes low to generate reference voltage Voutm at the output of column bit-line amplifier 83. After that, signal S1 goes low to capture the voltage Voutm on capacitor 23. Next, a pulse of signal Rp is used to reset node 66 and floating diffusion node 13. At this time, column amplifier output is equal to Voutp. After that, signal S2 goes low to capture the voltage Voutp on capacitor 25. At the end of phase 91, the difference between voltages Voutp and Voutm is digitized. Also, the comparator output MODE is read out to calculate the overflow charge.

The overflow charge in number of electrons is given by $$\text{overflow charge} = (Cp*\text{MODE} + (\text{SwingFD}*C\text{total}))/q, \quad (3)$$

where MODE is equal to zero for case 1 and V1 for case 2. Here, SwingFD is the voltage swing at floating diffusion node 13, q is the electron charge. The value of SwingFD is given by $$\text{SwingFD} = |Voutp - Voutm|/(GA*GSF) \quad (4)$$

where GA and GSF are the gains of column bit-line amplifier 83 and source follower 17, respectively. In the following discussion, the "swing voltage" is defined to be SwingFD as shown in Eq. (4)

After phase 91 is finished, phase 92 is started. At the beginning of phase 92, signal AR goes high to reset the column bit-line amplifier 83. Signals S1 and S2 also go high to connect the column amplifier output Vout to sampling capacitors 23 and 25. Signal TX3 goes low to isolate node 66 from floating diffusion node 13. A pulse of signal Rp is used to reset floating diffusion node 13. Signal CR goes high to reset comparator 86. During phase 92, signal Vc1 is low and Vc2 is high; therefore, the switching terminal is connected to MODE, and its voltage is equal to zero. Next, signal AR goes low to generate reference voltage Voutm at column amplifier output. After that, signal S1 goes low to capture the voltage Voutm on capacitor 23. Next, a pulse of signal TX1 is used to transfer the photocharge which remains on the photodiode 11 to floating diffusion node 13. At this time, column bit-line amplifier 83 has an output equal to Voutp. After that, signal S2 goes low to capture the voltage Voutp on capacitor 25. At the end of phase 92, the difference between voltages Voutp and Voutm is digitized.

The above-described embodiments depend on the choice of V1 and Vref. V1 is preferably chosen to be as high as possible. Provided V1 is less than the maximum voltage at which a junction in the pixel sensor will break down. In addition, V1 is preferably less than Vr. In one exemplary fabrication process, the breakdown voltage at node 66 is about 3.88 volts. If reset voltage Vr and SwingFD are equal to 2.4 volts and 1.3 volts respectively, voltage V1 is about 1.3 volts. As V1 is equal to 1.3 volts, the sum of voltages Vr and V1 is still less than 3.88 volts. The minimum value for V1 is equal to zero. In this case, the pixel doesn't operate in Ultra-High Dynamic Range mode.

The reference voltage Vref is optimized to get the maximum voltage swing at floating diffusion node 13. In other words, this voltage is optimized to get maximum well capacity. With the above parameters, Vref is chosen to make comparator 86 switch when the voltage at floating diffusion node 13 is less than 1.1 volts which is the difference between Vr and SwingFD. The maximum value for SwingFD is 1.3 volts because above this value the photocharge from photodiode 11 may not be transferred to floating diffusion node 13 completely or the bit line 19 is saturated.

In the above-described embodiments, the output of the capacitive overflow pixel was amplified in a source follower prior to being coupled to the bit line. However, it is to be understood that other forms of amplifiers or buffers could be utilized for this function including capacitive trans-impedance amplifiers.

In the above-described embodiments, the switching terminal of the overflow capacitor is connected to either ground or a boost voltage that is greater than ground. However, it will be appreciated that "ground" is merely a label for one power rail and Vdd is a label for the other power rail which is greater than ground, the boost voltage, V1, being intermediate between Vdd and ground.

The above-described embodiments of the system have been provided to illustrate various aspects of the system. However, it is to be understood that different aspects of the system that are shown in different specific embodiments can be combined to provide other embodiments of the system. In addition, various modifications to the system will become apparent from the foregoing description and accompanying drawings. Accordingly, the system is to be limited solely by the scope of the following claims.

What is claimed is:

1. An apparatus comprising a plurality of pixel sensors connected to a bit line, at least one of said pixel sensors comprising:
    a capacitive overflow pixel sensor characterized by an overflow capacitor having a switching terminal, and a floating diffusion node;
    a buffer amplifier that connects said floating diffusion node to said bit line in response to a row select signal;
    a switch that connects said switching terminal to either ground or a boost voltage; and
    a switch controller that controls said switch and is connected to said bit line, said switch controller determining a voltage on said bit line, said switch controller connecting said switching terminal to said boost voltage during an exposure of said pixel sensor to light and to either ground or said boost voltage during a readout of charge stored on said overflow capacitor depending on said voltage on said bit line.

2. The apparatus of claim 1 wherein said switch controller outputs a signal indicative of whether said switching terminal was connected to ground or said boost voltage during said readout.

3. The apparatus of claim 1 wherein said switch controller comprises a comparator that compares said voltage on said bit line with a predetermined reference voltage, said comparator having an output of either ground or said boost voltage if said voltage on said bit line is greater than, or less than or equal, to said predetermined reference voltage, respectively.

4. The apparatus of claim 3 wherein said floating diffusion node is characterized by a voltage swing on said floating diffusion node and wherein said predetermined reference voltage is chosen to maximize said voltage swing.

5. The apparatus of claim 1 wherein said capacitive overflow pixel sensor are constructed in a process that sets a maximum allowed voltage across a gate in said capacitive overflow pixel sensor and wherein said floating diffusion node are reset to a reset voltage prior to exposing said apparatus to light, said boost voltage plus said reset voltage being less than said maximum allowed voltage.

* * * * *